（12）United States Patent
Hofschuster et al.

(10) Patent No.: US 9,284,074 B2
(45) Date of Patent: Mar. 15, 2016

(54) METHOD, SATELLITE, AND A SYSTEM OR AN ARRANGEMENT WITH AT LEAST ONE SATELLITE FOR DETECTING NATURAL OR ARTIFICIAL OBJECTS, AND THE USE THEREOF IN THE EXECUTION OF SAID METHOD

(75) Inventors: Gerd Hofschuster, Munich (DE); Sascha Mahal, Bremen (DE); Martin Kassebom, Bremen (DE)

(73) Assignee: OHB System AG, Bremen (DE)

( * ) Notice: Subject to any disclaimer, the term of this patent is extended or adjusted under 35 U.S.C. 154(b) by 1114 days.

(21) Appl. No.: 12/519,876

(22) PCT Filed: Dec. 17, 2007

(86) PCT No.: PCT/EP2007/011070
§ 371 (c)(1),
(2), (4) Date: Sep. 16, 2009

(87) PCT Pub. No.: WO2008/074449
PCT Pub. Date: Jun. 26, 2008

(65) Prior Publication Data
US 2010/0038490 A1 Feb. 18, 2010

(30) Foreign Application Priority Data
Dec. 18, 2006 (DE) .......................... 10 2006 060 091

(51) Int. Cl.
*B64G 3/00* (2006.01)
*B64G 1/36* (2006.01)
(Continued)

(52) U.S. Cl.
CPC ................ *B64G 3/00* (2013.01); *B64G 1/1085* (2013.01); *B64G 1/365* (2013.01); *F41G 3/02* (2013.01); *F41H 11/02* (2013.01)

(58) Field of Classification Search
CPC ........ B64G 1/365; B64G 3/00; B64G 1/1085; F41G 3/02; F41H 11/02
USPC ......................................... 244/158.4; 89/1.11
See application file for complete search history.

(56) References Cited

U.S. PATENT DOCUMENTS 3,439,427 A  4/1969  Gow
5,678,175 A * 10/1997  Stuart et al. .................. 455/13.1

(Continued)

FOREIGN PATENT DOCUMENTS

DE     34 21 855 A1    12/1985
DE     3421855 A1      12/1985

(Continued)

OTHER PUBLICATIONS

Press Release of Raytheon Company: "Raytheon Delivers Missile-Detection and Tracking Sensors for U.S. Space Program", Mar. 6, 2006.

(Continued)

*Primary Examiner* — Brian M O'Hara
*Assistant Examiner* — Michael Kreiner
(74) *Attorney, Agent, or Firm* — Rothwell, Figg, Ernst & Manbeck, P.C.

(57) ABSTRACT

The invention relates to a method, a satellite, and a system or an arrangement with at least one satellite for detecting flying objects that are located in the vicinity of a planet, planetoid or similar celestial bodies. The invention further relates to the use thereof for carrying out said method and particularly to a constellation of LEO satellites (LEO=Low Earth Orbit) as an early warning of ballistic missiles, wherein said constellation comprises only satellites on equatorial orbits or orbits with low inclination. Satellite constellations in the low earth orbit (LEO) for missile detection are used for early warning of ballistic missiles, either by detecting the combustion phase of the flying object or by detection during the free-flight phase. The viewing direction of the sensors can be directed directly toward the earth or at an angle past the atmosphere.

34 Claims, 3 Drawing Sheets

(51) Int. Cl.
  *B64G 1/10* (2006.01)
  *F41G 3/02* (2006.01)
  *F41H 11/02* (2006.01)

(56) References Cited

U.S. PATENT DOCUMENTS

| | | | | |
|---|---|---|---|---|
| 5,927,652 | A * | 7/1999 | Lansard | 244/158.1 |
| 5,960,097 | A * | 9/1999 | Pfeiffer et al. | 382/103 |
| 6,026,337 | A * | 2/2000 | Krigbaum et al. | 701/13 |
| 6,331,870 | B1 * | 12/2001 | LeCompte | 348/144 |
| 7,869,952 | B1 * | 1/2011 | Budzien | 702/3 |
| 7,952,511 | B1 * | 5/2011 | Geer | 342/13 |
| 8,511,614 | B2 * | 8/2013 | Robinson | 244/158.4 |

FOREIGN PATENT DOCUMENTS

| | | |
|---|---|---|
| DE | 198 45 911 A1 | 4/2000 |
| EP | 0 992 429 A2 | 4/2000 |
| EP | 0992429 A2 | 4/2000 |
| EP | 0 992 429 B1 | 9/2005 |

OTHER PUBLICATIONS

Missile Defense Agency: "Space Tarcking and Surveillance System (STSS)", MDA facts, Jan. 30, 2004.

Raythoen Company, "Raytheon Delivers Missile Detection and Tracking Sensors for US Space Program", El Segundo CA (SPX), Mar. 7, 2006, pp. 1-3.

Missile Defense Agency, Space Tracking and Surveillance System (STSS), MDAfacts, Jan. 30, 2004, pp. 1-2.

* cited by examiner

METHOD, SATELLITE, AND A SYSTEM OR AN ARRANGEMENT WITH AT LEAST ONE SATELLITE FOR DETECTING NATURAL OR ARTIFICIAL OBJECTS, AND THE USE THEREOF IN THE EXECUTION OF SAID METHOD

CROSS REFERENCE TO RELATED APPLICATION

This application is a 35 U.S.C. 371 National Phase Entry Application from PCT/EP2007/011070, filed Dec. 17, 2007, which claims the benefit of European Patent Application No. 10 2006 060 091.6 filed on Dec. 18, 2006, the disclosure of which is incorporated herein in its entirety by reference.

TECHNICAL FIELD

The invention relates to a method, a satellite and a system or a constellation with at least one satellite for detecting natural or artificial objects, especially flying objects and satellites which are located in the vicinity to a planet, a planetoid or similar celestial bodies, their use to carry out the method and especially a constellation of LEO (Low Earth Orbit) satellites for an early warning of ballistic missiles, wherein said constellation comprises only satellites on equatorial orbits or orbits with low inclination.

BACKGROUND

To survey military or other security-related operations and activities in space, the object of which can be to disturb or destroy satellites, in order to enable the detection of any anti-satellite spacecraft or other space activities, it is necessary to have a situational awareness of space close to the earth. Such operations can also only serve for reconnaissance purposes without initially causing any direct damage. At present it is normal to use ground-based radar systems or telescopes for this purpose. Depending on the flight path of a satellite, it can, however, take days until this satellite reaches the field of view of such a detection instrument. Using optical telescopes, there can also be other external circumstances, such as darkness or poor weather, which prevent or at least substantially impair detection.

Furthermore, an early warning system for the detection of ballistic missiles using satellites is known: One example is the US Defence Support Program DSP, which uses satellites in the geostationary orbit. As part of the US follow-up program, the Space Based Infrared System SBIRS, as well geostationary (SBIRS-High) as also low-flying (SBIRS-Low) satellites were used. The SBIRS-Low Project has, however, never gone beyond the concept and experimental phase because of the expense and costs (global system). This kind of early warning serves as a detection of incoming missiles and serves as an early release of an alert and a pre-setting of radar equipments of a defensive architecture.

Detection can be broken down into two different tasks, i.e., detection of one or more incoming missiles in the boost or combustion phase and tracking of the burnt-out missiles in the succeeding free-flight phase or free-flight trajectory.

Early warning satellites in geostationary orbit offer advantageous fixed geometric conditions. This means that a small number of satellites is possible. A particular disadvantage in this case is that due to the great distance of the satellite from the target area or target object the requirements regarding the detection sensor system increase. Furthermore, large space transport carriers are necessary for positioning the satellites.

Due to the geometric conditions, a geostationary satellite has to be able to detect an incoming missile from a great distance and against the natural radiation background of the earth and also distinguish it from civil carriers or other heat sources. Tracking in the free-flight phase using geostationary satellites is not considered technically feasible.

Satellites in high elliptical orbits are similarly complex and expensive like GEO systems (geostationary satellites) but require an increased number of satellites compared to these.

LEO satellites have a comparatively short distance to the object under surveillance, which enables small cost-effective satellites to be constructed. A disadvantage, however, is the small surveillance or viewing area and field of view, respectively, of a LEO satellite, which due to orbit mechanics cannot be fixed on an area. Previous concepts typically require more than 20 or even more than 30 satellites for a global operational capability, such as, for example, described in DE 198 45 911 A1. The number of satellites required could not be significantly reduced by these concepts even if limited to an area of interest, so that a global surveillance capability was automatically provided when designing a satellite constellation.

SUMMARY

The object of the invention is to provide a method, a satellite and a system or a constellation with at least one satellite for detecting flying objects which are located close to a planet, a planetoid or similar celestial bodies, by means of which the aforementioned disadvantages can be avoided, with said method, satellite, system or constellation furthermore being of very simple construction and enabling a defined, clearly reliable, and also very early detection and/or early warning of flying objects.

The embodiment of the method according to the invention for detecting natural or artificial objects, especially flying objects, which are located close to a planet, a planetoid or similar celestial bodies, with at least one satellite moving or flying on an equatorial orbit and/or polar orbit around the planet, planetoid or similar celestial bodies, with the at least one satellite being fitted with at least one sensor, is characterised in that at least one satellite or one ring of satellites is provided on an equatorial orbit for the detection of incoming missiles.

Equally, the same satellite can be used to detect other space objects, especially if these are on a low earth orbit.

Satellites on a low earth orbit are, for example, used for earth observation, reconnaissance or satellite telephony. These satellites require approximately one and half hours for an orbit. This means that all satellites in low orbits in the worst case of a polar orbit can enter the field of view of the equatorial ring and be detected after not later than approximately a quarter orbit, i.e., after just approximately 25 minutes. This time duration is so short that practically no military space operations can take place undetected and a continuous log of all active and inactive satellites can be maintained. The system includes at least one satellite which is fitted with at least one sensor which enable(s) missiles to be detected just on the basis of their own thermal radiation, or hot missile exhaust plume radiation and their flight path to be determined. Accordingly, the same sensor can also be suitable for detecting satellites on their orbit.

The detection of natural or artificial objects, especially flying objects, in space can, in principal, be achieved by using sensors. Accordingly, this method is used on earth and in space. Active or passive sensors can be used for this purpose. Active sensors, such as radar equipment, "illuminate" the possible target object and measure the reflection of the transmitted pulse. Passive sensors are characterised in that they detect and measure signatures associated with the object, for example their electromagnetic radiation. This measurement can take place in various wavelength ranges. An important factor in this case is that the instrument is designed so that a distinction is made by the measurement between the object and the area surrounding the object. Examples of possibilities of doing so are measurement of the beam strengths, measurement in selected wavelength ranges, an analysis of movement, etc.

The present invention enables an early warning of the launching of ballistic missiles for a surveillance area in the mid latitudes, with the aid of a direction of view or viewing direction tangential to the earth's surface using only few satellites.

The present invention furthermore enables the determination of the flight path and the cueing of ground- and air-borne sensors.

Furthermore, the method according to the invention enables a global space surveillance in the low-earth orbit with only a small time lag.

The invention thus proposes to survey only a very limited field of view (a few degrees of latitude of the earth). This is possible in that the satellites view the earth tangentially from the orbit over the equator. A limited field of view of the sensors on board of the satellites means a smaller amount of data that has to be evaluated and/or transmitted by radio to the ground station. This reduced data amount also makes it very easy to use other surveillance satellites as a relay station. The warning of a detected missile can be transmitted to earth without a delay and also without direct radio contact between the ground station and the satellite which has detected a missile. Furthermore, the flying missile is seen by the sensor in front of and from, respectively, the cold space background, which results in a high signal-to-noise ratio of the thermal radiation and thus substantially reduces the false alarm rate.

A very precise determination of the flight path of a flying missile can be achieved by observing the same missile from two different locations, i.e., viewing it from two satellites. A geometric method of this kind is, for example, triangulation.

If only one satellite is available for tracking the flight path, its own speed, in the case of the LEO satellite, relative to the earth of typically 7 km/s can be used. If there are several pictures of a flying missile taken at various time points, the satellite records the target object from a different location in each case. This information can in turn be used by a geometric method to precisely determine the flight path of the missile.

For optimisation, the altitude of the satellite orbit(s) being used can be varied according to the threat scenario. Typical orbit altitudes are between 800 km and 2200 km.

The equatorial ring can be expanded by a polar ring for free-flight phase tracking of ballistic missiles with orbits close the poles. Tangential surveillance geometry can also be used in this case.

This object is achieved with regard to an apparatus and/or arrangement or constellation in a surprisingly simple manner.

Further very advantageous design details of the satellite according to the invention or the system according to the invention are described.

Finally, the scope of the invention also includes that at least one satellite and/or system can be used for the performance of the method according to the invention in a significantly advantageous manner.

BRIEF DESCRIPTION OF THE DRAWINGS

Further features, advantages and details of the invention are given in the following description of preferred embodiments of the invention and by the use of drawings. The drawings are as follows.

DETAILED DESCRIPTION

Figure 1:
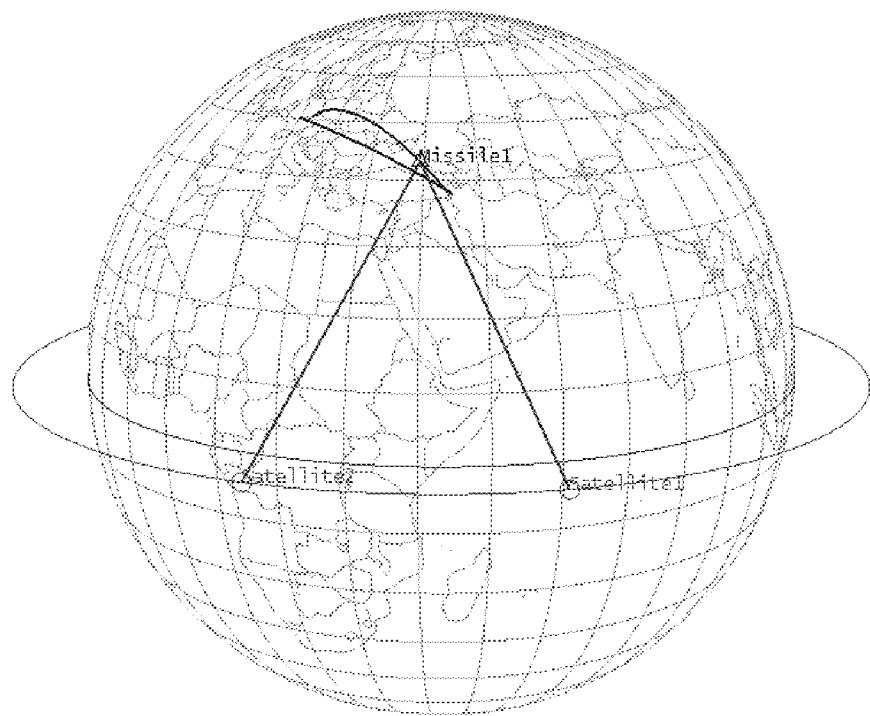
FIG. 1 A schematic representation of an embodiment of a method or system according to the invention using lines of sight from at least two satellites on an equatorial ring to a flying ballistic missile.

An equatorial orbit, as used herein, is a flight path of satellites which, as shown in FIG. 1, lies almost exclusively over the equator or an orbit close to or in vicinity of the equator. These orbits are characterised in that their orbital plane relative to the equatorial plane is inclined by not more than approximately ±3°, but especially not more than approximately ±5° to 10°. On the other hand, the term polar or polar-close orbit is an orbit which is vertical relative to the equatorial orbit or vertical relative to an orbit close to or in vicinity of the equator, i.e., passes both over the North Pole and over the South Pole. An application on or over the earth is described in the following but it is, however, obvious that the invention can, if necessary, be used without difficulty for other planets, planetoids or other celestial bodies.

At present, those countries of the world that are particularly under suspicion of developing, purchasing or using ballistic missiles or other armament programs have to be surveyed. These are, for example, Iran, Syria, North Korea, and Pakistan.

These countries lie on a specific band, with the geographic latitude of these countries being similar (a northerly latitude of approximately 24 degrees to 44 degrees). Therefore, it is sufficient in present practice (threat situation) to regionally survey only the countries within these degrees of latitude.

The functioning of the invention is explained by means of the drawings.

FIG. 1 shows the orbit (equatorial ring) of the satellites and their line of sight to a ballistic missile, which, for example, has been fired from Iran in the direction of Germany. In this example, two satellites have simultaneous visual contact with the missile and can react accordingly, for instance, by transmitting warning signals to earth giving the position of the missile by radio.

Fur this purpose, a geostationary satellite can be used as a relay station if the surveillance satellites are not in any case in direct contact with ground stations. Alternatively, it is also possible that the satellites continuously transmit video signals (thermal images, etc.) to earth. The images received in a base station on earth are evaluated, i.e., "scanned" according to missile types or specimens. With this alternative, the on-board electronics of the satellites can be simpler and the computer-expensive evaluation then takes place in the ground station.

Surprisingly, by using the measuring method of the present invention it has been possible to reduce the number of satellites and therefore substantially reduce costs. Furthermore, simpler and therefore more cost-effective satellites can be used: Conventional satellites for missile detection view the earth "from above" but the satellites of the present invention, however, view tangentially just above the earth's atmosphere.

FIG. 1 shows examples of two satellites of an equatorial ring, and also their line of sight to a flying ballistic missile.

Figure 2:
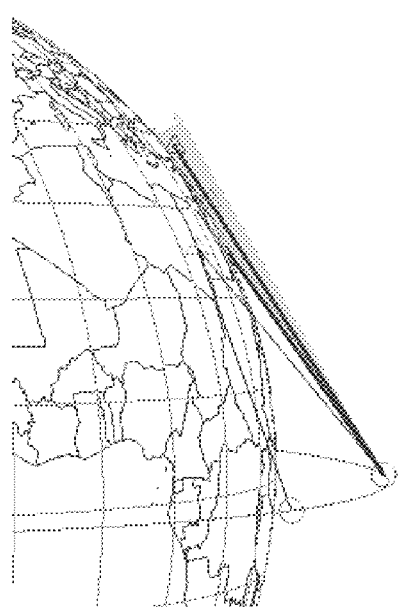
FIG. 2 A schematic representation of a direction of view, in oblique geometry, from two satellites on an equatorial ring, corresponding to FIG. 1.

In FIG. 2, it can be seen that the sight connection or line of sight to the ballistic missile, shown schematically as a triangle, passes tangentially past the earth. In this way, the satellite is watching space as background image, which only has a thermal radiation of 4 Kelvin. A missile stands out clearly against this background: Either in the boost phase due to the hot exhaust plume or due to the thermal radiation of the missile body. The false alarm rate is thus distinctly reduced because high signal-to-noise ratios can be realised.

In contrast to this, with systems according to prior art, the satellites view in nadir geometry (vertical to the earth) and therefore see the infrared background radiation of the earth. The false alarms due to these approaches are also due finally to the fact that the intensity of the radiation of the missile body is similar to the intensity of the background radiation of the earth. In other words, the system from prior art has a substantially poor signal-to-noise ratio and therefore requires substantially more expensive and complicated measuring devices on board of the satellite.

The system according to the invention must, as already mentioned, merely survey a limited geometrical area on or of the earth. A global surveillance (along all degrees of latitude) is not necessary. This means that there is no need for rotating instruments on board of the satellites. This enables simpler, fixed measuring devices (cameras or heat sensors), which only have to be swivelled for certain areas, to be used on board of the satellites, which is in turn cost effective. The sensors according to prior art must always be kept rotating, but in contrast, the present invention merely requires that the fixed sensors be aligned by simple swivelling to align with the target area when the satellite is overflying said target area.

The method and associated system according to the invention thus allow, with the aid of three-axis stabilised satellites, the sensors to continuously align with the surveillance area, including during an overfly or flyby.

For this purpose, the position of the complete satellite can be continuously adjusted during a flyby and/or overfly.

As an alternative or addition to this, it is also possible to change the surveillance direction merely by the swivelability of the instrument or sensor relative to the satellite.

An alignment can take place simply from the satellite itself, preferably by means of gyroscopes. With this known method, the alignment of the satellite is influenced by built-in gyros. In this case, the speed of the gyros is changed as required. The advantage of this is that no fuel is required to change the position of a satellite. Furthermore, when a satellite has consumed its fuel it has also reached the end of its lifetime. As the mass of a satellite is very limited for cost reasons and other boundary conditions such as the capacity of the launch rocket, it is advantageous not to use attitude control propulsion units because their operation is associated with fuel consumption. Therefore, this method is a very cost-effective way of realising and operating the proposed satellite system.

As can also be seen from FIG. 1, the satellites are in an orbit approximately over the equator. A special feature of the invention is therefore that the orbit of the satellites does not lie exactly over the degrees of latitudes to be observed: Due to the particular direction of view of the satellites, it is surprisingly possible with satellites that move exclusively over the equator to survey or monitor regions which lie in the aforementioned latitudes of approximately 24 to 44 degrees.

As will be described later, satellites on an orbit which is at right angles to the equatorial orbit (i.e., over the North or South Pole of the earth) can be alternatively or additionally used.

The direction of view of the satellites is a particular characteristic of the invention and is shown in FIG. 2. As can be seen, the satellite is at an altitude (typically 800 to 3000 km above the earth's surface, particularly advantageously at an altitude of 1000 to 2500 km, preferably at an altitude of 1100 to 1800 km above the earth's surface) which affords a tangential view of the corresponding latitudes (approximately 24 to 44 degrees north), so that the line of sight of the satellite intercepts the earth's surface at these degrees of latitude tangentially. In this case, it is necessary under certain circumstances to take account of the earth's atmosphere. In such cases, a line of sight would then not be along the earth's surface but instead, according to transmission (depending on the wavelengths of the radiation of the missile), would be on the uppermost layer of the atmosphere or on the upper layers of the atmosphere, typically above upper cloud layers (from approximately 10 km above the earth's surface for the boost phase of the missile propulsion unit or units corresponding to very high thermal radiation). No interference due to the atmosphere is expected above an altitude of approximately 100 km, so that at least then the missile body itself with its comparatively low thermal radiation can be detected.

FIGS. 1 and 2 each show only two satellites in each case. However, more satellites can equally be used under certain circumstances for a system according to the invention (see below).

The triangles shown in FIG. 2 represent the target of detection, i.e., the missile. Because FIG. 2 shows different cases, several such triangles are, of course, shown.

The triangles represent potential missiles. It can be seen that at high geographical latitudes the equatorial satellites lose their sight connection to the missiles. In this case, the satellites on the polar orbit can undertake the further detection.

Figure 3:
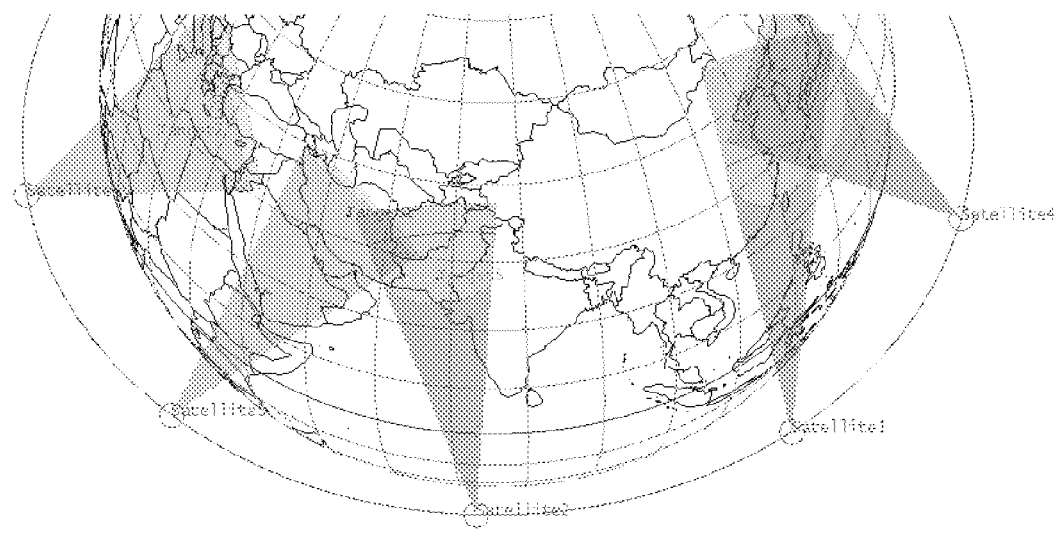
FIG. 3 A schematic top view of a plurality of satellites for alignment of the satellites of an equatorial ring with the respective target areas.

FIG. 3 shows different satellites of an equatorial ring whose field of view is directed to possible areas of interest. Under certain circumstances it is possible that an area is surveyed simultaneously by several satellites.

Conventional satellites used for earth surveillance look at the earth's surface. If such a known satellite were to be swivelled so that it looked tangentially on to the surface of the earth, a problem would then arise because such a satellite is not optimised to the wavelength range for detection of ballistic missiles. Even after such an optimisation, the resolution may possibly be unsuitable for the desired purpose. A particular disadvantage of systems to prior art is, however, that the satellites do not radio the image data quickly enough to earth: The conventional satellite has a large field of view, which means that its cameras generate large amounts of data. Because of its amount, this satellite may not be able to evaluate the data itself but instead has to wait until it receives radio contact with the ground station and can then send the data, but in the case of a missile warning system this can be already too late.

In contrast to this, the tangential observation of the earth's surface as proposed by the invention enables the use of sensors (optical camera or thermal imaging camera) with a very flat field of view. This substantially reduces the amount of data generated by the sensor.

Smaller amounts of data have several advantages: A surveillance satellite which detects a missile can radio its image data to the ground station without delay, if necessary by using the other surveillance satellites if at that time it does not have direct radio contact to the ground station. The limitation of the relay function to smaller data amounts enables the surveillance satellites to have simpler equipment.

Furthermore, a surveillance satellite can itself evaluate the image data, provided it is not too comprehensive and can then submit only the results of its evaluation (missile yes/no, type if necessary, position, flight data, etc., of the missile) to the ground station, again if necessary with the aid of the other surveillance satellites (or other communication satellites), as a relay.

An essential advantage of the method according to the invention is that, on the basis of the smaller number of satellites and the simpler on-board instruments of the satellites, the amount of data to be processed is smaller and therefore the evaluation or processing device (for example in the ground station) can be less complex. Also the amount of data (images) which the satellite has to transmit to the ground station is substantially less if the satellite does not already evaluate the image data and transmits only the results (for example the position of the detected missile) to earth.

An appropriate number of satellites for surveying an area begins with approximately 6 satellites. The optimum number is approximately 10 satellites.

Optimising the system to the respective requirements can consist of the number of satellites, their orbiting altitude or by satellites on equatorial orbits on different orbiting altitudes. Depending on the altitude of the orbits used, different requirements may result with respect to the satellites because these are then exposed to different radiation levels.

The instruments installed in early warning systems are typically detectors in the infrared wavelength range. Depending on the object, a range of between 2 and 20 micrometers can be chosen. In this case, different wavelengths ranges are normal in the boost and free-flight phases. If necessary, the optical instrument can be additionally cooled in order to guarantee its functioning.

If a missile is fired over the poles or the flight path leads into high geographic latitudes, it can no longer be detected by a satellite stationed on an equatorial ring. In this case, it is appropriate to have a satellite present close to a pole, which can undertake detection of the missile.

Figure 4:
FIG. 4 A schematic representation of a further embodiment of a method or system according to the invention using lines of sight from at least two satellites on a polar ring to a flying ballistic missile, cumulatively or alternatively (not illustrated) to the embodiment of the method or system according to the invention using lines of sight of at least two satellites on an equatorial ring.

As can be seen in FIG. 4, this can be guaranteed by a ring of satellites on a polar orbit. A polar ring of this kind can also enable the relay function for the onward transmission of data to the ground station.

Furthermore, FIG. 4, as besides was already seen in FIG. 1, shows that the individual satellites can be individually swivelled as required and in fact relative to each other and/or to their direction of movement. Whereas the right leading satellite of the two adjacent satellites has a direction of surveillance obliquely rearwards, i.e., to the left, the left following satellite is directed obliquely forwards, i.e., to the right. A swivelling capacity of this kind can be achieved by means of three-axis stabilised satellites, for instance by using swirl wheels or gyro arrangements, etc. Because of such a swivelling capacity, the possible applications of the method and system according to the invention can be further increased and the configuration can be versatile and particularly variable. Furthermore, in this way, the number of satellites to be used can also be kept small or even further reduced.

In this connection, the satellite can be aligned by swivelling individually as required to suit the application. If, for example, the satellite is on the equatorial orbit and is aligned in the north direction, regardless of whether following or leading, as in FIGS. 1 and 4, the satellite can be easily swivelled from the northerly surveillance direction to a southerly surveillance direction, perhaps because, for example, a country in Africa or South America is to be detected. The same is valid without limitation for an easterly or westerly surveillance direction, and vice versa, with any combinations also being possible.

The advantage according to the invention is in a LEO satellite constellation which is limited to the detection of missiles which are launched from mid geographical latitudes. The use of low-inclined satellite orbits (orbits over the equator) combined with an oblique directional view of the sensors enables a substantial reduction in the number of satellites required on one hand and on the other hand allows the use of fixed non-rotating sensors.

Thus, low overall costs of a constellation result due to a small number of satellites necessary, relatively simpler sensors (reduction of the clutter problem, i.e., distinguishing a missile from the reflection of the background) and the small data bandwidth required.

Figure 5:
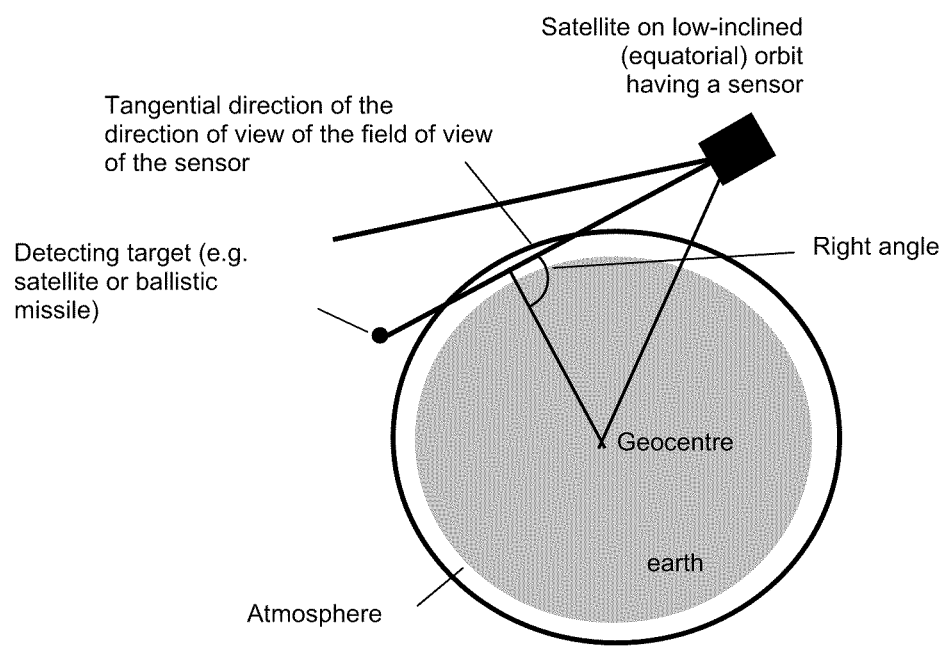
FIG. 5 A schematic representation for explaining a tangential surveillance geometry of a satellite according to the invention.

The tangential surveillance geometry is further explained schematically in the following with respect to FIG. 5.

A satellite is on an orbit around the earth above the equator, especially on a low-inclined (equatorial) orbit. A sensor (not shown in more detail), which is arranged on the satellite, is aligned or directed so that its field of view just bypasses the atmosphere or passes through the upper atmospheric layers. It can be seen from FIG. 5 that the surveillance instrument can be radially symmetrically aligned or directed about the axis between the geocentre and surveillance satellite. Accordingly, the surveillance direction of the sensor can have a north or south component and an east or west component. Consequently, the area to be surveyed lies more in the mid geographical latitudes (where there is a strongly pronounced north or south direction) or more in the vicinity of the equator (where there is a strongly pronounced east or west direction).

The tangential surveillance geometry ensures that no background radiation from the earth strikes the instrument and interferes with the detection of a missile or a satellite. A high signal-to-noise ratio is thus achieved. However, when aligning or directing the sensor, care must be taken to make sure that there are no bright celestial bodies, such as the sun or moon, which impede detection. This can occur particularly if the electromagnetic radiation of these celestial bodies can strike the sensor directly. A possible solution in this case is to align or direct the surveillance satellite so that an east direction component is replaced by a west direction component of equal magnitude, or vice versa.

The invention is also suitable for measuring flight tests of missiles in the mid latitudes and for space surveillance.

For tracking ballistic missiles whose flight path leads close over the poles, the equatorial ring can be supplemented, either as an alternative or an addition, by a polar ring.

For ballistic missiles or warheads detached from missiles (or just a warhead) must be steered to the target area to increase the strike accuracy. In the vacuum of space, this is generally accomplished by smaller missile propulsion units. The same technical principal is generally used to adjust the orbit of satellites.

If missile propulsion units with hot gases and plume, respectively, are used for this purpose, then the proposed constellation enables this missile plume to be detected with the aid of suitable sensors, for example, infrared sensors. These measuring results can then be used for an improved orbit determination of a ballistic missile or satellite.

A further application of the method and system according to the invention is the orbit determination of objects that enter the earth atmosphere from the vacuum of space. The friction heat which occurs in this case generates a light phenomenon which the system can detect. Such objects entering the earth's atmosphere can be natural objects such as meteors or artificial objects such as, for example, ballistic missiles, warheads, space shuttles or satellites.

Camouflage or decoy bodies are a special case of artificial objects entering the atmosphere. These are distributed around an incoming warhead in order to make identification of the actual dangerous object, i.e., the warhead, in a defensive architecture difficult. The proposed method and system according to the invention can even enable this identification with the aid of sensor data.

The present invention is not limited to the exemplary embodiments presented. Thus, it is possible to perform the method according to the invention by means of a single satellite. Any other number of satellites going beyond that is also conceivable. As an alternative or addition, a ground station can be used on the planet, planetoid or other celestial bodies, which can interact with the at least one satellite. Furthermore, it is conceivable, if there is a suitable performance capability of the sensors, to also detect all satellites in other, sometimes higher, orbits, despite the perhaps greater distance to the satellites of the equatorial ring. Furthermore, one or more satellites of the equatorial ring can be supplemented by sensors which enable not only a detection but also an analysis of the status of the target object. Thus, for example, information can be obtained regarding externally visible instruments, tools, damage or other properties. The present invention also includes the use of at least one satellite and/or system for performing the method according to the invention.

The invention claimed is:

1. A method for detecting one or more artificial objects in the vicinity of a planet, a planetoid or similar celestial body with one or more satellites, comprising:
   moving or flying an at least one satellite of said one or more satellites along an orbit around the planet, planetoid or similar celestial body, wherein said at least one satellite includes one or more sensors and said orbit is one or more of an equatorial orbit, an orbit close to an equator, a polar orbit, and an orbit close to a pole of the planet, planetoid or similar celestial body; and
   observing at least one of said one or more artificial objects with said one or more sensors against a cold space background, said one or more sensors pointing in a direction tangential to the planet, planetoid or similar celestial body.

2. The method of claim 1, further comprising aligning at least one of said one or more satellites to a predetermined area of the planet, planetoid or similar celestial body.

3. The method of claim 2, wherein said observing occurs in a predetermined area of the planet, planetoid, or similar celestial body being between approximately latitude 24 degrees north and 44 degrees north.

4. The method of claim 2, wherein said aligning includes swivelling said at least one of one or more satellites in a direction of movement of the planet, planetoid or similar celestial body.

5. The method of claim 1, further comprising aligning at least one sensor of the one or more sensors to a predetermined area of the planet, planetoid or similar celestial body.

6. The method of claim 5, wherein said aligning includes swivelling said at least one of one or more sensors in a direction of movement of the planet, planetoid or similar celestial body.

7. The method of claim 1, further comprising moving or flying at least six satellites.

8. The method of claim 1, further comprising aligning said one or more satellites tangentially to said planet, planetoid or similar celestial body.

9. The method of claim 8, wherein said aligning includes a leading or following swivelling of said at least one of one or more satellites in a direction of movement of the planet, planetoid or similar celestial body.

10. The method of claim 8, wherein aligning said one or more satellites tangentially to said planet, planetoid or similar celestial body comprises aligning at least one of said satellites such that it does not observe the surface of said planet, planetoid or similar celestial body during observation of said one or more artificial objects with said one or more sensors.

11. The method of claim 1, wherein said observing occurs in a direction of view that extends past the atmosphere, or through an upper atmospheric layer, of the planet, planetoid, or similar celestial body.

12. The method of claim 1, further comprising moving or flying at least one other satellite of said one or more satellites along another orbit around the planet, planetoid or similar celestial body, wherein said another orbit is an equatorial orbit, an orbit close to the equator, a polar orbit, or an orbit close to a pole of the planet, planetoid or similar celestial body.

13. The method of claim 12, wherein said orbit is an equatorial orbit and said another orbit is a polar orbit or an orbit close to the north and south pole of the planet, planetoid or similar celestial body.

14. The method of claim 12, wherein said other satellite includes one or more sensors, further comprising:
   observing said at least one of said one or more artificial objects with said one or more sensors of the one or more satellites from different locations.

15. The method of claim 12, wherein said at least one of one or more satellites move or fly at different altitudes.

16. The method of claim 1, wherein said one or more artificial objects is a missile or a ballistic missile.

17. The method of claim 1, further comprising:
   determining a flight path of said one or more artificial objects, wherein said determining is based at least in part on data recorded by said one or more sensors.

18. The method of claim 1 wherein said one or more artificial objects includes an artificial flying object, further comprising:
   detecting said artificial flying object based on data generated by said one or more sensors.

19. The method of claim 18, wherein said data includes pictures of said one or more artificial objects.

20. The method of claim 1, wherein said observing is carried out in a low earth orbit.

21. The method of claim 1, wherein at least one sensor of the one or more sensors is a thermal imaging camera or an optical camera.

22. The method of claim 1, further comprising transmitting data regarding said at least one or more artificial objects to a ground station on the planet, planetoid or similar celestial body.

23. The method of claim 1, wherein the artificial objects are moving in a low earth orbit.

24. The method of claim 1, wherein said at least one of one or more satellites moves at an altitude of between 800 and 3000 km above earth's surface.

25. The method of claim 1, further comprising moving or flying at least ten satellites.

26. A satellite for detecting artificial objects in the vicinity of a planet, a planetoid or similar celestial body, wherein the satellite is configured to move around the planet, planetoid or similar celestial body along one or more of an equatorial orbit, an orbit close to the equator, a polar orbit, and an orbit close to a pole of the planet, planetoid or similar celestial body, comprising:

one or more sensors configured to observe at least one or more of said artificial objects against a cold space background, said one or more sensors having a the field of view pointing in a direction tangential to the planet, planetoid or similar celestial body; and a transmitter configured to transmit data generated by said one or more sensors regarding said one or more artificial objects.

27. The satellite of claim 26, wherein said one or more sensors includes a thermal imaging camera or an optical camera.

28. The satellite of claim 26, further comprising one or more of swirl wheels or gyro arrangements configured to swivel said satellite such that it is aligned with the planet, planetoid or similar celestial body.

29. The satellite of claim 26, wherein at least one of said one or more sensors has a flat field of view.

30. The satellite of claim 26, wherein at least one of said one or more sensors is configured to operate in the infrared range.

31. The satellite of claim 26, further comprising one or more of swirl wheels or gyro arrangements configured to swivel said satellite such that it is tangentially aligned with the planet, planetoid or similar celestial body.

32. A system for detecting one or more artificial objects in the vicinity of a planet, a planetoid or similar celestial body, comprising:

one satellite; and at least one another satellite, wherein said one satellite is configured to move around the planet, planetoid or similar celestial body along at least one of an equatorial orbit, an orbit close to the equator, a polar orbit, and an orbit close to a pole of the planet, planetoid or similar celestial body, and comprises:

one or more sensors configured to observe at least one of said one or more artificial objects against a cold space background, said one or more sensors having a field of view pointing in a direction tangential to the planet, planetoid or similar celestial body; and a transmitter configured to transmit data generated by said one or more sensors regarding the artificial object.

33. The system of claim 32, further comprising:

a ground station on the planet, planetoid or similar celestial body in communication with one or more of said one and said at least one another satellites.

34. The system of claim 32, wherein said at least one another satellite is a geostationary satellite configured to receive said data from said one satellite.

\* \* \* \* \*